(12) United States Patent
Booth et al.

(10) Patent No.: US 7,433,558 B2
(45) Date of Patent: Oct. 7, 2008

(54) METHODS FOR OPTICAL ISOLATION IN HIGH POWER FIBER-OPTIC SYSTEMS

(75) Inventors: Timothy J. Booth, West Melbourne, FL (US); Ismail T. Yilmaz, Oviedo, FL (US); James F. Brennan, III, Winter Park, FL (US)

(73) Assignee: Raydiance, Inc, Orlando, FL (US)

( * ) Notice: Subject to any disclaimer, the term of this patent is extended or adjusted under 35 U.S.C. 154(b) by 0 days.

(21) Appl. No.: 11/978,905

(22) Filed: Oct. 29, 2007

(65) Prior Publication Data

US 2008/0063340 A1  Mar. 13, 2008

Related U.S. Application Data

(62) Division of application No. 11/281,144, filed on Nov. 16, 2005, now Pat. No. 7,308,171.

(51) Int. Cl.
| | |
|---|---|
| *G02B 6/32* | (2006.01) |
| *G02B 6/00* | (2006.01) |
| *G02B 5/30* | (2006.01) |
| *G02B 27/28* | (2006.01) |

(52) U.S. Cl. .................. 385/34; 385/1; 385/2; 385/11; 385/33; 385/39; 385/40; 385/50; 359/246; 359/280; 359/281; 359/283; 359/484; 359/485; 359/501; 32/26; 32/27

(58) Field of Classification Search .......... 385/34; 359/484
See application file for complete search history.

(56) References Cited

U.S. PATENT DOCUMENTS

| | | | | |
|---|---|---|---|---|
| 5,278,853 | A * | 1/1994 | Shirai et al. | 372/37 |
| 5,315,431 | A * | 5/1994 | Masuda et al. | 359/281 |
| 5,446,813 | A * | 8/1995 | Lee et al. | 385/31 |
| 5,602,673 | A * | 2/1997 | Swan | 359/281 |
| 5,631,771 | A * | 5/1997 | Swan | 359/484 |
| 5,642,447 | A * | 6/1997 | Pan et al. | 385/31 |
| 5,661,829 | A * | 8/1997 | Zheng | 385/33 |
| 5,734,762 | A * | 3/1998 | Ho et al. | 385/11 |
| 6,088,153 | A * | 7/2000 | Anthon et al. | 359/341.32 |
| 6,141,140 | A * | 10/2000 | Kim | 359/281 |
| 6,556,733 | B2 * | 4/2003 | Dy et al. | 385/11 |
| 2002/0186915 | A1 * | 12/2002 | Yu et al. | 385/11 |

* cited by examiner

*Primary Examiner*—Frank G Font
*Assistant Examiner*—Ryan Lepisto
(74) *Attorney, Agent, or Firm*—Carr & Farrell LLP

(57) ABSTRACT

Methods for optical isolation in high peak power fiber-optic systems prevent damage to a facet within a fiber-optic isolator caused by back-reflected light from, for example, an optical amplifier. Preventing damage to the facet may include expanding a mode area of the back-reflected light and/or reducing a change in refractive index.

11 Claims, 5 Drawing Sheets

METHODS FOR OPTICAL ISOLATION IN HIGH POWER FIBER-OPTIC SYSTEMS

CROSS-REFERENCE TO RELATED APPLICATIONS

This application is a divisional application of U.S. patent application Ser. No. 11/281,144 filed Nov. 16, 2005 now U.S. Pat. No. 7,308,171 and titled "Method and Apparatus for Optical Isolation in High Power Fiber-Optic Systems."

BACKGROUND OF THE INVENTION

1. Field of the Invention

The present invention generally relates to the field of fiber-optic systems, and in particular to methods and apparatuses for optical isolation in high peak power fiber-optic systems.

2. Description of the Related Art

In high power fiber-optic systems, optical isolators are used to protect low-power components from damage that may be caused by back-reflected light from amplifiers or other components. For example, a fiber-optic optical isolator may be used to protect a laser light source or a pre-amplifier from destabilizing or damaging feedback.

Generally, a fiber-optic optical isolator is a non-reciprocal optical device based on magneto-optic rotation of a plane of polarization of a propagating optical signal. Such a phenomenon is observed in certain crystals and commonly referred to as the "Faraday effect." In the high power systems, the back-reflected light may carry enough power to cause irreversible physical damage to an output fiber of the optical isolator. Such damage often occurs at an end facet the output fiber inside of the optical isolator because there is typically a significant change in index of refraction between the output fiber and atmospheric gas, or other medium, disposed on the other side of the end facet.

SUMMARY OF THE INVENTION

Various deficiencies of the prior art are addressed by the present invention of a method and apparatus for optical isolation in high peak power fiber-optic systems. In some embodiments, the invention prevents damage to a facet of an output fiber of a fiber-optic isolator caused by back-reflected light from, e.g., a power amplifier of an optical signal. In some embodiments, this damage is prevented by defocusing the back-reflected light before it passes through a region of significant change in index of refraction.

In a first aspect of the present invention, there is provided a fiber-optic isolator having an input module including an input fiber, an input polarizer, and an input collimator, a state of polarization rotator module, and an output module including an output fiber having a facet, an output polarizer, and an output collimator. A beam expanding device is disposed between the output fiber and the output collimator and is configured to expand (e.g., defocus) any back-reflected light. By selecting an appropriate index of refraction for the beam-expanding device, the potential for damage at the facet of the output fiber is reduced. By expanding the back-reflected light, before the light leaves the beam-expanding device, the potential for damage at a facet of the beam expanding device is reduced.

In further aspects of the invention, there are provided methods for preventing damage to fiber-optic isolators used in high-power optical systems where an output of the optical isolator is coupled to an input of the last gain stage for amplifying a propagating optical signal.

Various embodiments of the invention include an optical isolator, comprising an input module including an input fiber, an input polarizer, and an input collimator, a state of polarization rotator module, and an output module including an output fiber having a facet, a beam expanding device, an output polarizer, and an output collimator, the beam expanding device configured to prevent damage to the facet of the output fiber due to back-reflected light in the output fiber.

Various embodiments of the invention include an optical isolator, comprising an input module including an input fiber, an input polarizer, and an input collimator, a state of polarization rotator module, and an output module including a multimode output fiber, an output polarizer, and an output collimator.

Various embodiments of the invention include a method, comprising generating an optical signal, coupling the optical signal into an optical isolator, the optical isolator having an input fiber and an output fiber, coupling an output from the optical isolator to an input of a first optical amplifier, receiving back-reflected light at the output fiber from the first optical amplifier, and reducing a fluence of the back-reflected light at a facet between the output fiber and an air gap to a value that is less than the damage threshold of the facet, by expanding the received back-reflected light.

Various embodiments include an optical isolator comprising an input module including an input fiber, an output module including an output fiber having a facet within the optical isolator, and means for reducing damage to the facet of the output fiber caused by any back-reflected light received through the output fiber.

BRIEF DESCRIPTION OF THE DRAWINGS

The teachings of the present invention will become apparent by considering the following detailed description in conjunction with the accompanying drawings, in which.

Herein, identical reference numerals are used, where possible, to designate identical elements that are common to the figures. The images in the drawings are conventionally simplified for illustrative purposes and are not depicted to scale.

The appended drawings illustrate exemplary embodiments of the invention and, as such, should not be considered limiting of the scope of the invention.

DETAILED DESCRIPTION OF THE INVENTION

Embodiments of the present invention generally relate to methods and apparatuses for optical isolation in high peak power fiber-optic systems. The invention may advantageously be utilized for preventing damage to a facet of an output fiber of a fiber-optic isolator caused by back-reflected light from an input of an optical amplifier.

Figure 1A:
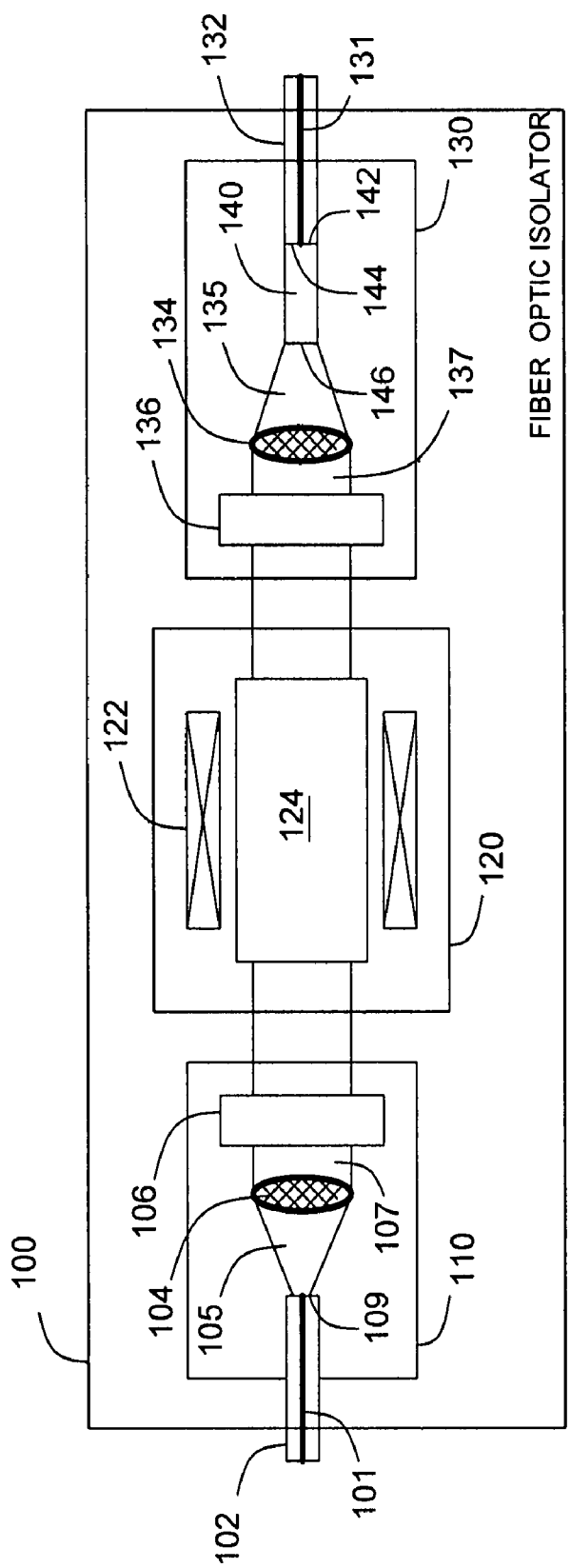
FIGS. 1A and 1B each depict a high-level block diagram illustrating an exemplary fiber-optic isolator in accordance with various embodiments of the invention.

FIG. 1A depicts a high-level block diagram illustrating an exemplary fiber-optic isolator 100 in accordance with various embodiments of the present invention. In the depicted embodiments, the fiber-optic isolator 100 comprises an input module 110, a state of polarization rotator module 120, and an output module 130.

The input module 110 includes an input fiber 102, an input collimator 104, and an input polarizer 106. Correspondingly, the output module 130 includes an output fiber 132, an output collimator 134, and an output polarizer 136. The state of polarization rotator module 120 generally includes a crystal media 124 and a magnetic unit 122. Transmission axes (not shown) of the input and output polarizers 106 and 136 are disposed at an angle of 45 degrees to one another. In a further embodiment, the isolator 100 may include an optional heat sink (not shown) configured to increase power-handling capabilities of the isolator by dissipating energy of the back-reflected light.

The input fiber 102 is generally a single mode fiber or a large mode area (LMA) fiber. The output fiber 132 can be a LMA fiber, a multimode fiber (a multimode fiber that supports only a few modes is also referred to as a "few-moded" fiber.), or a single mode fiber. The crystal media 124 facilitates non-reciprocal rotation of a plane of polarization of a propagating light by 45 degrees. In operation, the isolator 100 transmits light in a forward direction from the input fiber 102 to the output fiber 132 ("transmission direction"), and rejects the light propagating in the reverse direction, i.e., from the output fiber 132 to the input fiber 102 ("isolation direction").

The output fiber 132 is terminated ("capped") using a beam expanding device 140 coupled to a facet 142 of the output fiber 132. In one embodiment, a first facet 144 of the beam expanding device 140 is fused to the facet 142 of the output fiber 132, and a second facet 146 of the beam expanding device 140 is optically coupled to the output collimator 134. The beam expanding device 140 is selected to reduce the change in index of refraction experienced by the back-reflected light as the back-reflected light passes through facet 142, relative to the index of refraction change that would be experienced without the beam expanding device 140. By reducing this change in index of refraction, the power density that can be passed through facet 142 before damage results is increased.

The beam expanding device 140 is configured to expand the back-reflected light and reduce the power density of the back-reflected light at the facet 146 relative to the facets 142 and 144. An air gap is typically disposed between output collimator 134 and facet 146. Thus, the potential for damage at facet 142 is reduced by matching index of refraction, and the potential for damage at facet 146 (where there may be a larger change in index of refraction due to the air gap) is reduced by expanding the back-reflected light. In some embodiments, the total amount of back-reflected light that can be received through output fiber 132 without damage to fiber-optic isolator 100 is increased relative to systems that do not include beam expanding device 140. In some embodiments, an outer diameter of the beam expanding device 140 is substantially equal to or greater than an outer diameter of a cladding of the outer fiber 132. In some embodiments, the output fiber 132 comprises a multimode fiber and the output module 130 is configured to excite a single mode of the multimode fiber. In embodiments wherein output fiber 132 is a multimode fiber, expanding device 140 is optional.

The beam expanding device 140 may be considered as extending the output fiber 132 and providing a relatively larger facet for the back-reflected light to exit the output fiber 132/beam expanding device 140 combination, thus reducing fluence (e.g. power density) at the exit. For the back-reflected light, there is relatively little refractive index change at the interface between the facet 142 of the output fiber 132 and the first facet 144 of the beam expanding device 140. However, there may be a relatively large refractive index change at the interface between the second facet 146 of the beam expanding device 140 and the air space (or other optical element) between the beam expanding device 140 and the collimator 134. By providing a relatively large area at the second facet 146 of the beam expanding device 140, the greater change in refractive index occurs where the back-reflected light is of reduced power density. This reduces the possibility of damage for high peak power back-reflected light.

In various embodiments, the beam expanding device 140 may be formed from a coreless optical fiber (e.g., coreless optical fiber having a length of about 10 µm to 10 mm) and/or comprise a graded index (GRIN) lens. In various embodiments, the beam expanding device 140 includes a multimode fiber, a few-moded fiber, or a large mode field fiber, a GRIN fiber, or the like. In some exemplary embodiments, a diameter of the second facet 146 with is about 2 to 20 times greater than the diameter of the core 131, resulting in low power density of the back-reflected light at the facet 146.

Collimators 104 and 134 optically couple the input fiber 102 to the input polarizer 106 and the output fiber 132 to output polarizer 136, respectively. In particular, a facet 109 of the input fiber 102 may be disposed at approximately a focal point of the input collimator 104, and the second facet 146 of the beam expanding device 140 may be disposed approximately at a focal point of the output collimator 134.

In case of an optical signal propagating in the transmission direction, the input collimator 104 collects light 105 exiting a core 101 of the input fiber 102 and forms a beam 107 propagating through the input polarizer 106, the crystal media 124, and the output polarizer 136. Correspondingly, the output collimator 134 transforms the beam 137 exiting the output polarizer 136 into a beam 135 focused onto the second facet 146 of the beam expanding device 140. Typically, beam 135 passes through an air gap between output collimator 134 and beam expanding device 140.

The collimators 104 and 134 are illustratively shown as stand-alone lenses. In alternate embodiments (not shown), at least one of the input collimator 104 or the output polarizer 136 may be a portion of the input fiber 102 or the beam expanding device 140, respectively.

In some embodiments, the facets 109 and/or 146 are polished and/or coated using an optional anti-reflective coating. In further embodiments (not shown), at least one of the facets 109 or 146 may be angle-polished to an angle in a range from about 0 to 12 degrees (preferably, about 8 degrees) with respect to an optical axis between the input fiber 102 and the output fiber 132.

Further, an optical axis of at least one of the polarizers 106 or 136 may be tilted, with respect to the optical axis between the fibers 102 and 132, by about 0 to 7 degrees (preferably, about 3.6 degrees). Tilting the optical axis may be desirable because the angular polarized field of the polarizers 106 and/or 136 is not symmetrical about the normal angle at the face of the polarizers, and is dependent upon wavelength, ranging from about 5.9 degrees at 350 nm to about 7.5 at 2300 nm. At a wavelength of 1.5 um, the semi-polarized field of a KL Glan laser becomes zero on one side and 7.3 degrees on the other side of the normal. Thus, to have linear polarization, the incident beam should strike the first polarizer 106 at 7.3/2=3.6 degrees. The crossed polarizer 136 is also tilted so that the output is symmetrical to the incident beam. Tilting the optical axis is performed in some embodiments by angling the input fiber 102 and the output fiber 132 by 3.6 degrees with respect to a housing of the fiber-optic isolator 100.

Figure 1B:
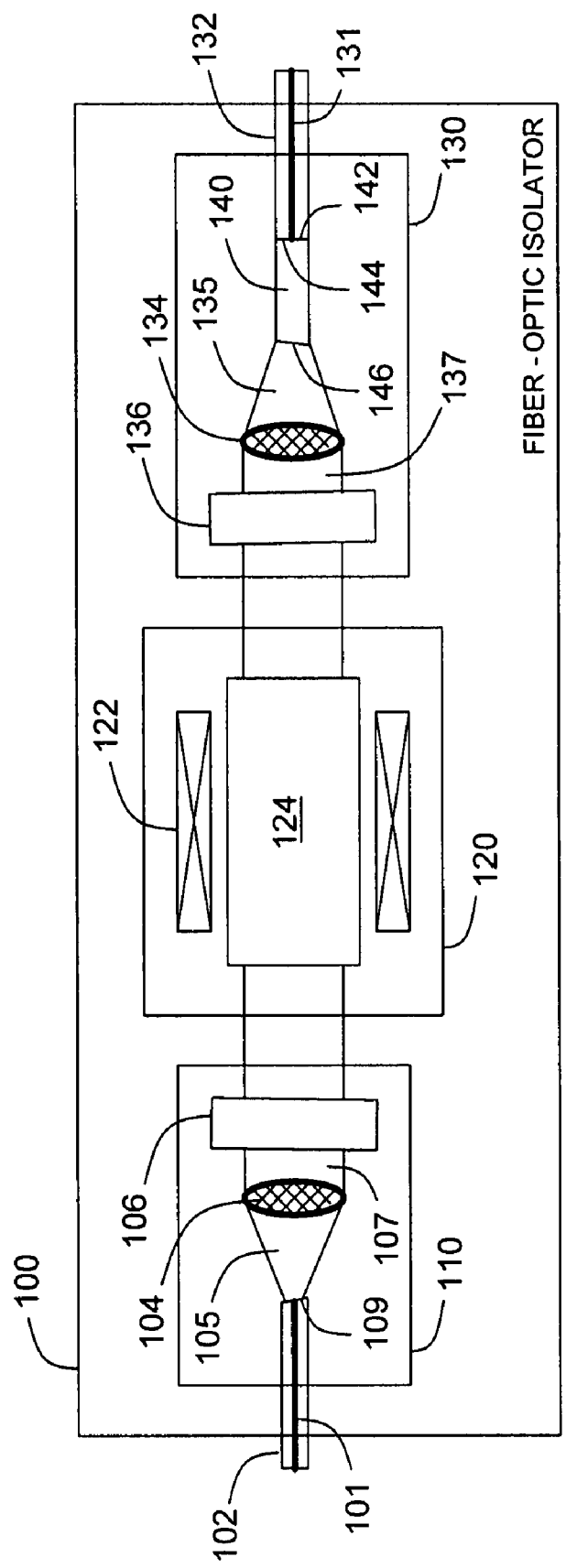

FIG. 1B depicts the exemplary fiber-optic isolator 100 wherein the input fiber 102 is angle polished, the second facet 146 is angle polished, and the polarizers 106 and 136 are tilted with respect to the axis of the input and output fibers.

Figure 2:
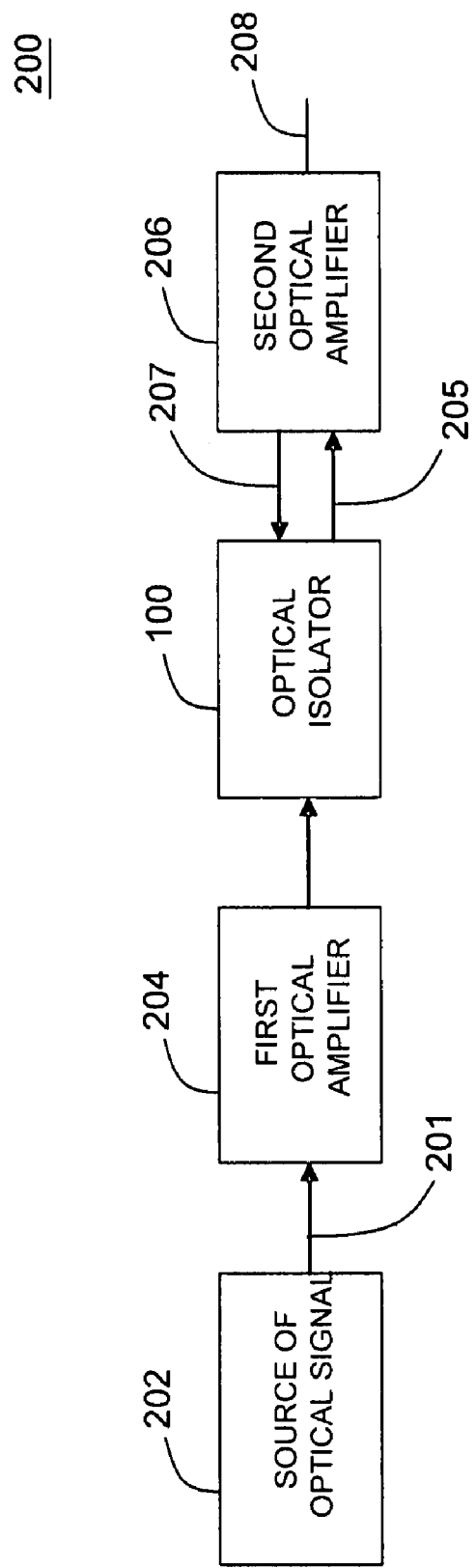
FIG. 2 depicts a high-level block diagram of an exemplary system of the kind wherein the fiber-optic isolator of FIG. 1 may be used, according to various embodiments of the invention.

FIG. 2 depicts a high-level block diagram of an exemplary system 200 of the kind where the fiber-optic isolator of FIG. 1 may be used. The system 200 may be used, for example, to generate high peak power optical pulses, high average power optical signals, among other laser-based high power applications.

Illustratively, the system 200 comprises a laser source 202 of an optical signal 201 at, for example, 1550 nm, an optional first optical amplifier (pre-amplifier) 204 configured to amplify the signal 201, the fiber-optic isolator 100, and a second optical amplifier 206. The amplifier 206 may be coupled to a delivery and/or compressor fiber 208, such as a Bragg fiber, a photonic bandgap fiber, a metallized hollow core fiber, and the like.

The optical amplifiers 204 and 206 are optionally erbium-doped fiber-optic amplifiers. In one embodiment, the laser source 202 is a fiber-optic ring laser, and the second amplifier 206 is a last gain stage for amplifying the optical signal 201. One suitable ring laser is described in a commonly assigned U.S. patent application Ser. No. 11/229,302, "Actively Stabilized Systems for the Generation of Ultrashort Optical Pulses," filed on Sep. 15, 2005, which is incorporated herein by reference.

In FIG. 2, an input of the isolator 100 (i.e., the input fiber 102) is coupled to an output of the first optical amplifier 204. Alternatively, when the first optical amplifier 204 is not used in the system 200, the input of the isolator 100 is coupled to an output of the laser source 202.

Referring to FIGS. 1 and 2, an output of the isolator 100 (i.e., the output fiber 132) is coupled to an input of the second amplifier 206. In operation, an optical signal 205 exiting the isolator 100 is amplified by the amplifier 206. A portion of the optical signal 205 and/or a signal propagating in the reverse direction (i.e., from an output to the input of the second amplifier 206), together, form back-reflected light 207. The back-reflected light 207 propagates along the output fiber 132 towards the isolator 100. From the output fiber 132, the back-reflected light 207 enters the beam expanding device 140.

In the system 200, the signal 205 may have an average power of about 1 to 10 W or greater and a peak power of about 1 to 50 KW or greater. The power density of the signal 205 in the output fiber 132 may exceed 1 GW/cm$^2$. Each of an average power and a peak power of the back-reflected light 207 may reach about 2 to 20 times that of the respective values of the optical signal 205.

In the beam expanding device 140, the back-reflected light 207 is expanded over an area having a substantially greater cross-section (e.g., 2 to 20 times greater) than a diameter of the core 131 of the output fiber 132. The back-reflected light 207 may be partially absorbed in the beam expanding device 140 and a cladding of the outer fiber 132. A remaining portion of the back-reflected light 207 exits the beam expanding device 140 through the second facet 146 and is then directed to be absorbed by other components of the isolator 100, including the crystal media 124, polarizer 136, polarizer 106 and an optional heat sink.

Figure 3:
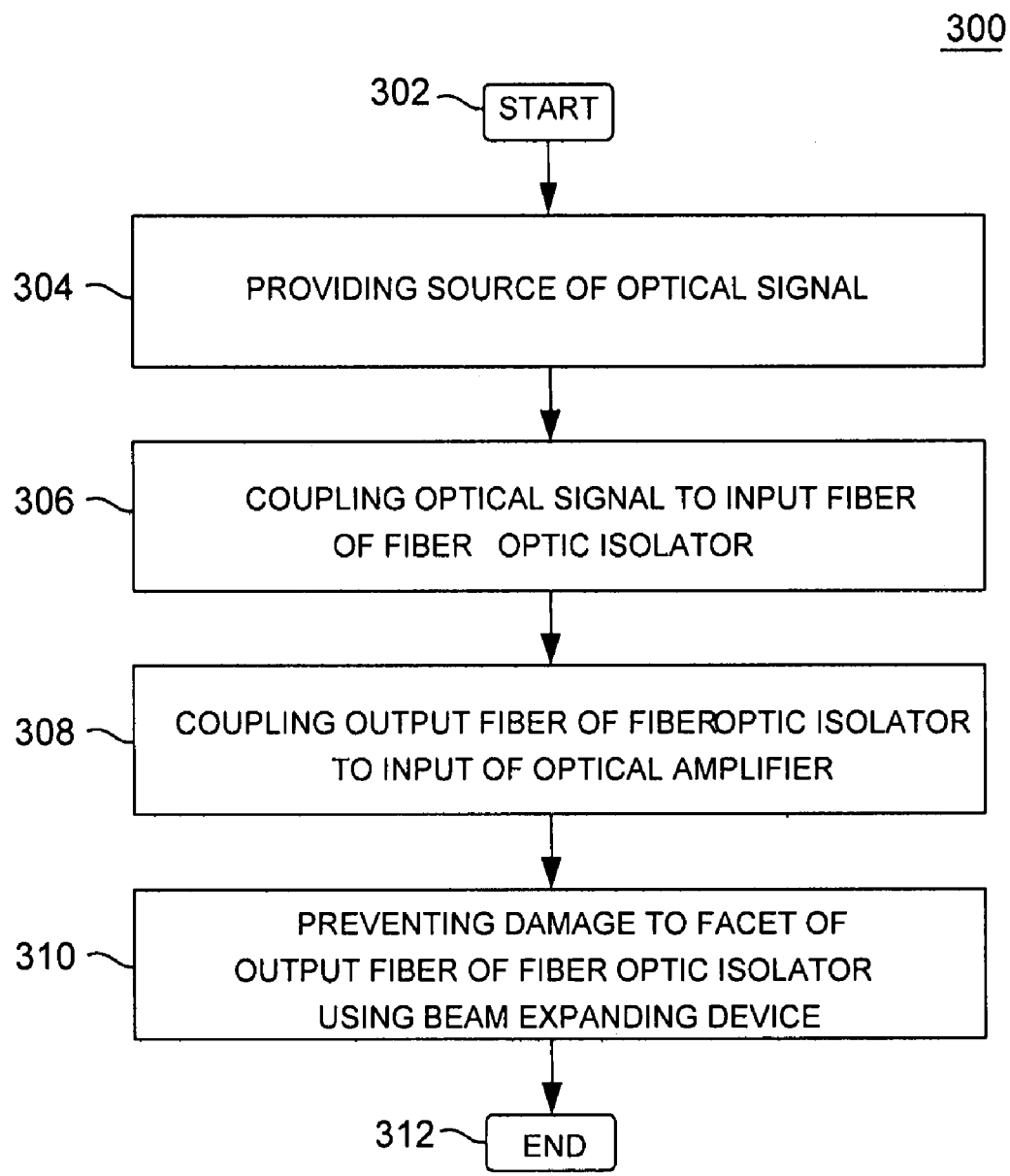
FIG. 3 depicts a flow diagram illustrating a method for optical isolation, in accordance with various embodiments of the invention.

FIG. 3 depicts a flow diagram illustrating a method 300 for optical isolation in accordance with one embodiment of the present invention. To best understand the invention, the reader should simultaneously refer to FIGS. 1-3.

The method 300 starts at step 302 and proceeds to step 304. At step 304, a source of an optical signal is provided (e.g., the laser source 202). At step 306, the optical signal (e.g., the signal 201) is coupled to an input fiber (e.g., the input fiber 102) of a fiber-optic isolator (e.g., the isolator 100). At step 308, the output fiber of the fiber-optic isolator may be coupled to an input of an optical amplifier, such as the second amplifier 206. At step 310, fluence of any back-reflected light at a potential damage point (e.g., the facet 146 of the beam expanding device 104) within the fiber-optic isolator is reduced to a value less than a damage threshold. In one embodiment, the fluence is reduced using a beam expanding device (e.g., the beam expanding device 140) matched to the facet 142 of the output fiber 132, as discussed above in reference to FIG. 1. At step 312, the method 300 ends.

Figure 4:
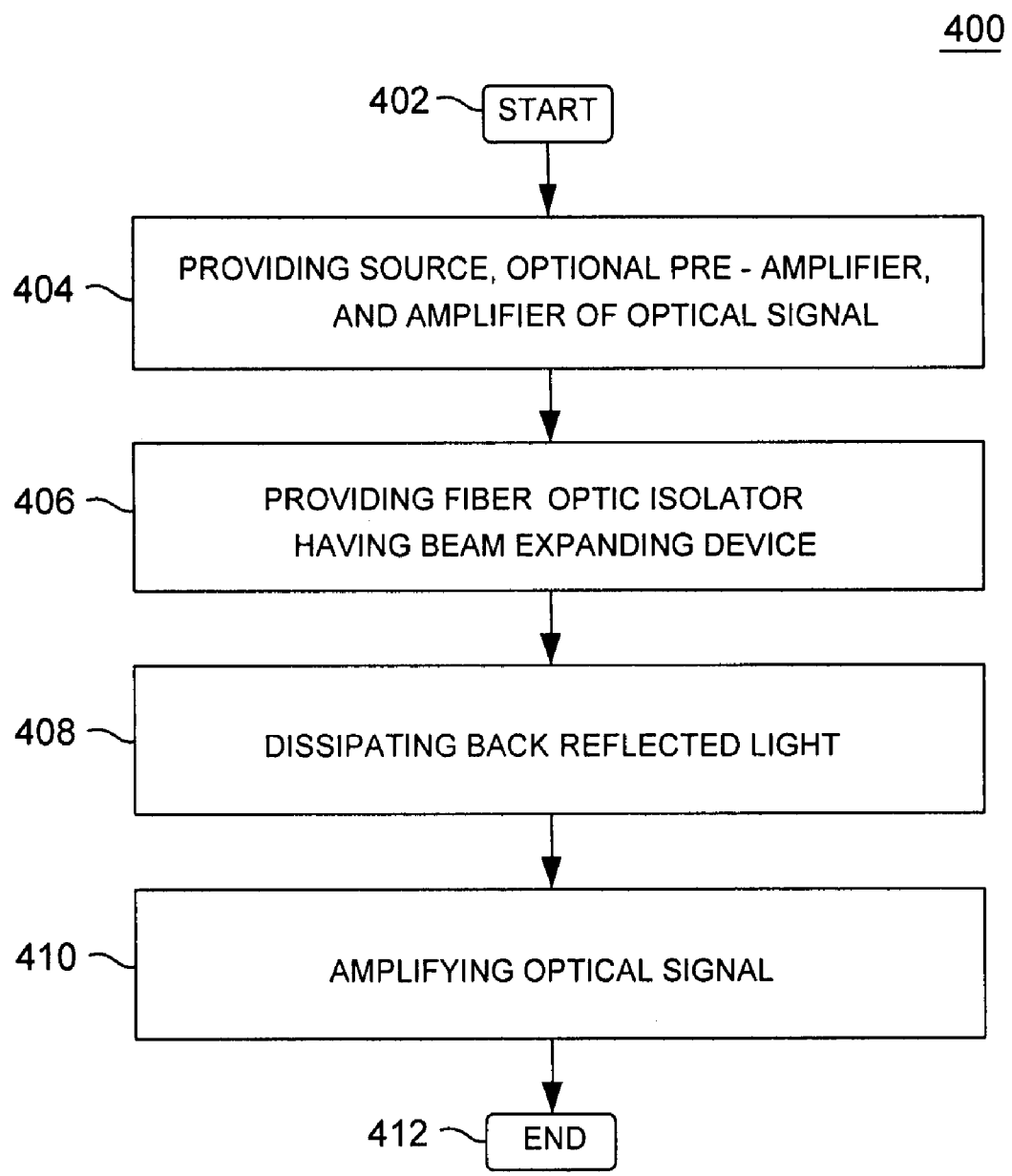
FIG. 4 depicts a flow diagram illustrating a method for preventing damage to a fiber-optic isolator caused by back-reflected light in the system of FIG. 2, in accordance with various embodiments of the invention.

FIG. 4 depicts a flow diagram illustrating a method 400 for preventing damage to a fiber-optic isolator caused by back-reflected light in the system of FIG. 2 in accordance with one embodiment of the present invention. In some embodiments, processing steps of the method 400 are sequentially performed in the depicted order. In alternate embodiments, at least two of these processing steps may be performed contemporaneously or in a different order. To best understand the invention, the reader should simultaneously refer to FIGS. 1-2 and 4.

The method 400 starts at step 402. At step 404, a source of an optical signal (e.g., the laser source 202 of the optical signal 201), an optional pre-amplifier (e.g., the first amplifier 204), and an amplifier of the optical signal (e.g., the second amplifier 206) are provided.

At step 406, a fiber-optic isolator configured for preventing damage to the facet due to back-reflected light is provided (e.g., the fiber-optic isolator 100). In some embodiments, the damage to the fiber-optic isolator is prevented by using a beam expanding device (e.g., the beam expanding device 140) coupled to a facet of an output fiber of the isolator, as discussed above in reference to FIG. 1. An input of the fiber-optic isolator (e.g., the input fiber 102) is coupled, either directly or through the optional pre-amplifier, to an output of the source of the optical signal. An output of the fiber-optic isolator (e.g., the output fiber 132) is coupled to an input of the amplifier of the optical signal. In operation, the amplifier originates the back-reflected light (e.g., the back-reflected light 207), which, along the output fiber of the fiber-optic isolator, propagates into the beam expanding device, as discussed above in reference to FIG. 2.

At step 408, the back-reflected light is passed from an output fiber to a beam expanding device, and dispersed by the beam expanding device. At step 410, an output of the amplifier is coupled to a respective recipient of the amplified optical signal. In a high-power fiber optic system (e.g., the system 200), such coupling may be provided using a delivery and/or compressor fiber, e.g., a Bragg fiber, a photonic bandgap fiber, a metallized hollow core fiber, and the like. At step 412, the method 400 ends.

While the foregoing is directed to the illustrative embodiment of the present invention, other and further embodiments of the invention may be devised by those skilled in the art without departing from the basic scope thereof that is determined by the claims that follow.

What is claimed is:

1. A method, comprising:
  generating an optical signal;
  coupling the optical signal into an optical isolator, the optical isolator having an input fiber and an output fiber;
  coupling an output from the optical isolator to an input of a first optical amplifier;

receiving back-reflected light at the output fiber from the first optical amplifier; and reducing a fluence of the back-reflected light at a facet between the output fiber and an air gap to a value that is less than the damage threshold of the facet, by expanding the received back-reflected light.

2. The method of claim 1, wherein reducing fluence at the facet comprises expanding a mode area of the back-reflected light at the facet of the output fiber.

3. The method of claim 1, wherein the output fiber comprises a multimode fiber.

4. The method of claim 1, further comprising coupling energy from the back-reflected light into a heat sink configured to increase a power handling capability of the optical isolator.

5. The method of claim 1 further comprising amplifying the optical signal using a second optical amplifier prior to introduction of the optical signal into the optical isolator.

6. The method of claim 5, wherein the second optical amplifier is a last gain stage for amplifying the optical signal.

7. The method of claim 5, further comprising coupling an output of the second optical amplifier to a delivery device and/or compressor fiber selected from the group consisting of a Bragg fiber, a photonic bandgap fiber, and a metallized hollow core fiber.

8. The method of claim 1, wherein a step of reducing fluence at the facet comprises expanding a mode area of the back-reflected light at the facet.

9. The method of claim 1, further comprising coupling a beam expanding device comprising a coreless optical fiber, a graded index lens to the output fiber, a graded index fiber, a multimode fiber, a few-moded fiber, or a large mode field fiber.

10. The method of claim 1, wherein the output fiber comprises a multimode fiber or a large mode fiber.

11. The method of claim 1, further comprising coupling the back-reflected light into a heat sink configured to increase a power handling capability of the optical isolator.

* * * * *